(12) United States Patent
Kondo et al.

(10) Patent No.: US 8,533,549 B2
(45) Date of Patent: Sep. 10, 2013

(54) MEMORY SYSTEM AND COMPUTER SYSTEM

(75) Inventors: Shigeo Kondo, Saitama (JP); Kiyomi Naruke, Kanagawa (JP); Naoyuki Shigyo, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 271 days.

(21) Appl. No.: 12/697,555

(22) Filed: Feb. 1, 2010

(65) Prior Publication Data
US 2010/0313101 A1  Dec. 9, 2010

(30) Foreign Application Priority Data

Jun. 3, 2009  (JP) .................................. 2009-134308

(51) Int. Cl.
*G10R 31/28* (2006.01)

(52) U.S. Cl.
USPC .......................................................... 714/733

(58) Field of Classification Search
USPC .......................................................... 714/733
See application file for complete search history.

(56) References Cited

U.S. PATENT DOCUMENTS

| | | | | |
|---|---|---|---|---|
| 7,089,473 B2 * | 8/2006 | Mates | ........................... | 714/733 |
| 7,260,758 B1 * | 8/2007 | Agrawal et al. | ................ | 714/733 |
| 7,320,100 B2 * | 1/2008 | Dixon et al. | .................. | 714/758 |
| 2008/0177937 A1 * | 7/2008 | Nishihara et al. | ............. | 711/103 |
| 2008/0250270 A1 | 10/2008 | Bennett | | |
| 2009/0006916 A1 * | 1/2009 | Lockwood et al. | ........... | 714/733 |
| 2009/0055698 A1 * | 2/2009 | Resnick | ........................ | 714/733 |
| 2009/0070520 A1 * | 3/2009 | Mizushima | ................... | 711/103 |
| 2009/0172499 A1 * | 7/2009 | Olbrich et al. | ................ | 714/773 |

FOREIGN PATENT DOCUMENTS

| | | |
|---|---|---|
| CN | 1013132917 A | 3/2009 |
| JP | 2000-339228 | 12/2000 |
| JP | 2001-167002 | 6/2001 |
| JP | 2007-323224 | 12/2007 |

OTHER PUBLICATIONS

Chinese Office Action issued Apr. 12, 2012, in Application No. 2010101222379, with an English Translation.
Chinese Office Action issued Dec. 31, 2012, in Application No. 2010101222379, with an English Translation.

* cited by examiner

*Primary Examiner* — Albert Decady
*Assistant Examiner* — Enam Ahmed
(74) *Attorney, Agent, or Firm* — Oblon, Spivak, McClelland, Maier & Neustadt, L.L.P.

(57) ABSTRACT

A memory system includes: a memory chip group including n chips of a nonvolatile semiconductor memory dividedly managed for each of unit areas having predetermined sizes, an unit area of one chip among the n chips storing an error correction code for a group including unit areas in the other n−1 chips associated with the unit area, and the chip that stores the error correction code being different for each of positions of the unit areas; and an access-destination calculating unit that designates, when data in the unit areas is rewritten, the unit area in which the error correction code of data is stored as a writing destination of rewriting data, and designates an unit area in which data before rewriting is stored as a storage destination of a new error correction code.

18 Claims, 7 Drawing Sheets

MEMORY SYSTEM AND COMPUTER SYSTEM

CROSS-REFERENCE TO RELATED APPLICATIONS

This application is based upon and claims the benefit of priority from the prior Japanese Patent Application No. 2009-134308, filed on Jun. 3, 2009; the entire contents of which are incorporated herein by reference.

BACKGROUND OF THE INVENTION

1. Field of the Invention

The present invention relates to a memory system and a computer system.

2. Description of the Related Art

As memory systems used for computer systems, a solid state drive (SSD) mounted with a nonvolatile semiconductor memory such as a NAND flash memory (hereinafter simply referred to as "NAND memory") attracts attention. The memory systems such as the SSD have advantages such as high speed and light weight compared with magnetic disk devices.

In general, a memory system is mounted with a plurality of (e.g., sixteen or thirty-two) NAND memory chips (hereinafter simply referred to as "chips") to increase a memory capacity. Each of the chips individually has a control circuit that controls a column decoder, a row decoder, and the like for accessing memory cells. When the control circuit fails, no data written in the chip can be read out. Control circuits of the chips are required that a fraction defective is about 1/n (n is the number of mounted chips) times or less as small as a fraction defective allowed for the entire memory system. Because the number of chips mounted on the memory system tends to increase, it is anticipated that a fraction defective allowed per one chip, which decreases in inverse proportion to the number of chips, makes memory system manufacturing more difficult in the future. Therefore, it is demanded to relax the fraction defective allowed for each single chip. There is also a demand for a mechanism to remedy data readout-disabled when the control circuit fails.

As measures to meet these demands, it is conceivable to impart redundancy to the number of chips and store an error correction code in a redundant chip. However, chips of a nonvolatile semiconductor memory have a limit in the number of times of writing and erasing. When a specific chip is used exclusively for the error correction code, erasing and rewriting are repeated every time any one of the other chips is rewritten. Therefore, deterioration of the chip exclusively used for the error correction code is worsened.

There are several publicly-known technologies for calculating an error correction code based on data stored in a storage element and, when an error occurs in the stored data, remedying the data based on the error correction code calculated in advance. For example, Japanese Patent Application Laid-Open No. 2007-323224 discloses a technology for forming a parity group with a plurality of chips. However, Japanese Patent Application Laid-Open No. 2007-323224 does not describe redundancy of the number of chips and a position where a parity is stored. Japanese Patent Application Laid-Open No. 2001-167002 discloses a technology for storing, in a semiconductor memory element, an error correction code concerning data stored in a disk area of the semiconductor memory element. Japanese Patent Application Laid-Open No. 2000-339228 discloses a technology including a dedicated memory card that stores parity information. However, deterioration of a section where the error correction code is stored cannot be suppressed by the technologies disclosed in Japanese Patent Application Laid-Open Nos. 2001-167002 and 2000-339228.

BRIEF SUMMARY OF THE INVENTION

A memory system according to an embodiment of the present invention comprises: a memory chip group including n chips of a nonvolatile semiconductor memory dividedly managed for each of unit areas having predetermined sizes, an unit area of one chip among the n chips storing an error correction code for a group including unit areas in the other n−1 chips associated with the unit area, and the chip that stores the error correction code being different for each of positions of the unit areas; and an access-destination calculating unit that designates, when data in the unit areas is rewritten, the unit area in which the error correction code of data is stored as a writing destination of rewriting data, and designates an unit area in which data before rewriting is stored as a storage destination of a new error correction code.

A computer system according to an embodiment of the present invention comprises a memory system, the memory system including: a memory chip group including n chips of a nonvolatile semiconductor memory dividedly managed for each of unit areas having predetermined sizes, an unit area of one chip among the n chips storing an error correction code for a group including unit areas in the other n−1 chips associated with the unit area, and the chip that stores the error correction code being different for each of positions of the unit areas; and an access-destination calculating unit that designates, when data in the unit areas is rewritten, the unit area in which the error correction code of the data is stored as a writing destination of rewriting data and designates an unit area in which the data before rewriting is stored as a storage destination of a new error correction code.

DETAILED DESCRIPTION OF THE INVENTION

Exemplary embodiments of a memory system and a computer system according to the present invention will be explained below in detail with reference to the accompanying drawings. The present invention is not limited to the following embodiments.

Figure 1:
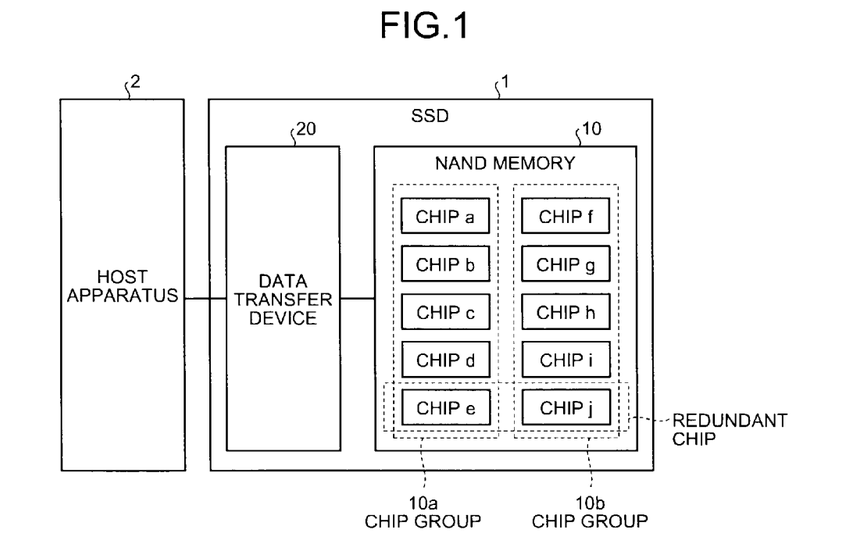
FIG. 1 is a diagram of a configuration of a SSD according to a first embodiment of the present invention.

FIG. 1 is a block diagram of a configuration of a memory system according to the first embodiment of the present invention. An SSD is explained below as an example of the memory system. However, the first embodiment is applied not only to the SSD but also to other memory systems.

As shown in FIG. 1, a SSD 1 is connected to a host apparatus 2 such as a personal computer according to a communication standard such as a SATA interface and functions as an external memory of the host apparatus 2. The SSD 1 and the host apparatus 2 configure a computer system. The SSD 1 includes a NAND memory 10 as a nonvolatile memory that stores data write-requested by the host apparatus 2 and a data transfer device 20 that controls data transfer between the host apparatus 2 and the NAND memory 10. A write/read request received by the SSD 1 from the host apparatus 2 includes address information (e.g., logical block addressing (LBA)) of a write/readout destination and the size of write/readout-requested data.

The NAND memory 10 has one or more chip groups including a plurality of chips. One redundant chip is added to each of the chip groups. The NAND memory 10 includes chips "a" to "j". Five chips in total including the chips "a" to "d" and a redundant chip "e" form a chip group 10a. Five chips in total including the chips "f" to "i" and a redundant chip "j" form a chip group 10b. Each of the chip groups 10a and 10b has a memory capacity for five chips. The memory capacity for four chips is used for storing data write-requested by the host apparatus 2 (hereinafter may be simply referred to as "data"). The remaining storage capacity for one chip increased by the addition of the redundant chip is used for storing a parity as an error correction signal for the data.

If a specific chip is an area exclusively used for storing a parity, erasing and rewriting are repeated every time one of the other chips is rewritten. Therefore, deterioration of the chip in which the parity is stored is severe compared with the other chips. To solve this problem, in the first embodiment, an area for storing a parity (a "parity area" hereinafter) is dynamically changed. Rules for storing data and a parity in the chip groups 10a and 10b are specifically explained below. Because the chip groups 10a and 10b have the same configuration, only the chip group 10a is explained as a representative.

In the chips "a" to "e", storage areas are divided into predetermined sizes. Both "data areas" (i.e. areas for storing data) and "parity areas" can exist even in the same chip at the same time. A parity bit stored in the parity area is a horizontal parity bit added to a group of data stored at the same position as the other four chips. The dividedly-managed area can be a single block or plural blocks ("A block" is a minimum set of memory cells which one can erase independently). In the following explanation, it is assumed that the unit area is a single block. A block in which data written from the host apparatus 2 is stored is represented as "a data storage block". A block in which a parity is stored is represented as "a parity storage block."

Figure 2:
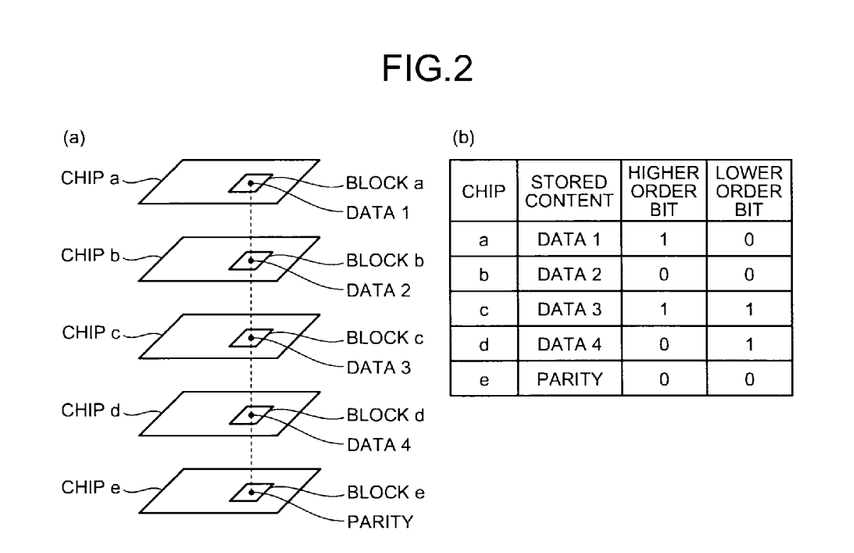
FIGS. 2a and 2b are diagrams for explaining a state in which data and a parity are stored.

FIG. 2a is a diagram for explaining a state in which data and a parity are stored in the chips "a" to "e" at a certain point of time. As shown in the figure, a block "a" of the chip "a", a block "b" of the chip "b", a block "c" of the chip "c", a block "d" of the chip "d", and a block "e" of the chip "e" are located in the same position in the chips "a" to "e". A parity (so-called horizontal parity) added to the data stored in the blocks "a" to "d" is stored in the block "e". FIG. 2b is a diagram for explaining data 1 to 4 respectively stored in memory cells at the same position of the blocks "a" to "d" shown in FIG. 2a and a parity of a group of the data 1 to 4 stored in a memory cell at the position of the block "e" same as the position of the data 1 to 4. It is assumed that the memory cells of the chips "a" to "f" are multi-level memory cells (2 bits/cell). A higher order bit of the data 1 is 1 and a lower order bit of the data 1 is 0, i.e., the data 1 has a value "10". Similarly, the data 2 to 4 respectively have values "00", "11", and "01". Because there are two "1"s in total in the higher order bits of the data 1 to 4, a parity of the higher order bits is "0". Because there are also two "1"s in the lower order bit, a parity of the lower order bit is also "0". Here even number parities are adopted as the parities. However, odd number parities are also possible.

FIGS. 3a and 3b are diagrams for explaining a change that occurs when the data 2 stored in the block "b" is rewritten with "10" as data 5 in the state shown in FIGS. 2a and 2b. When the data 2 is rewritten with the data 5, as shown on the left in FIG. 3A, the data 2 stored in the block "b" and the parity stored in the block "e" are erased. As shown on the right in FIG. 3A, the data 5 is written in the block "e" which has been the parity storage before the erasing block and a parity calculated anew for the data 1 and 3 to 5 is written in the block "b". As shown in FIG. 3B, the data 5 ("10") is stored in the block "e" and "10" is stored in the block "b" as the new parity.

Figure 3:
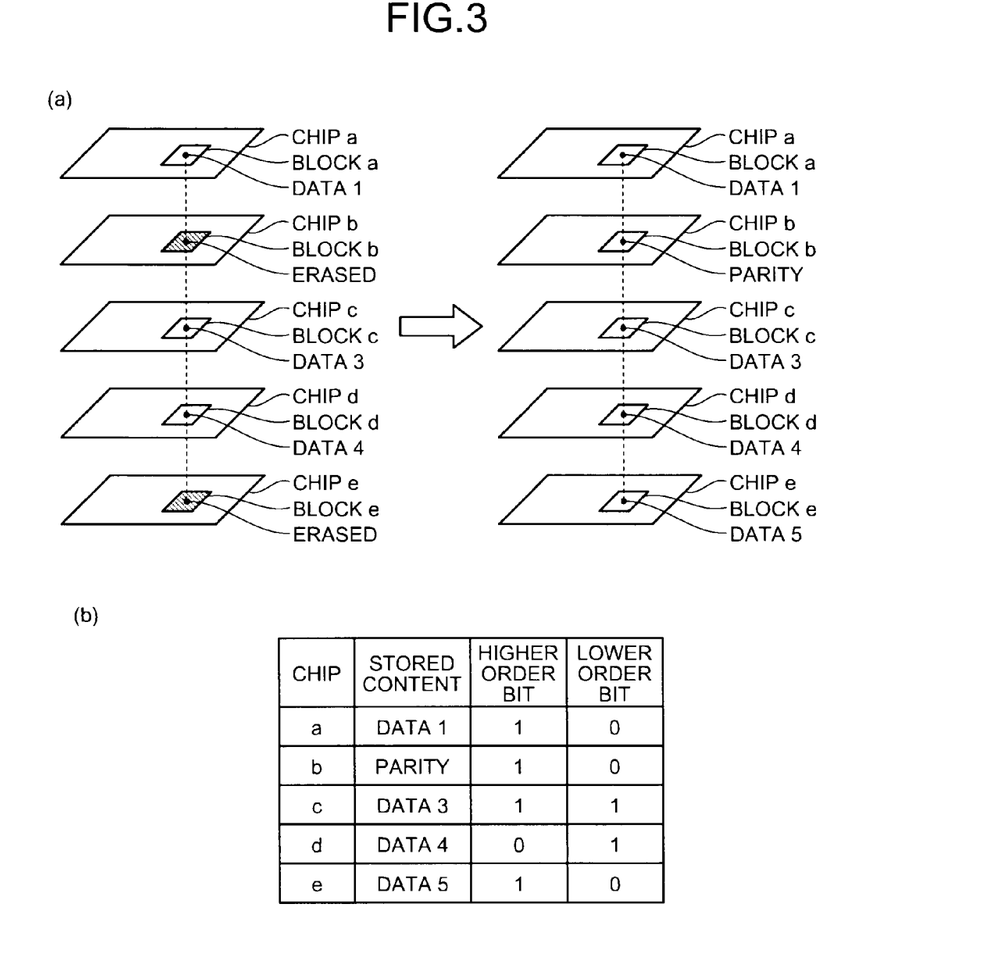
FIGS. 3a and 3b are diagrams for explaining a state in which data and a parity are stored.

FIGS. 4a and 4b are diagrams for explaining a change that occurs when the data 4 stored in the block "d" is rewritten with "00" as data 6 in the state shown in FIG. 3. When the data 4 is rewritten with the data 6, as shown on the left in FIG. 4a, the data 4 stored in the block "d" and the parity stored in the block "b" are erased. As shown on the right in FIG. 4a, the data 6 is written in the block "b" and a parity calculated anew is written in the block "d". As shown in FIG. 4b, the data 6 ("00") is stored in the block "b" and "11" is stored in the block "d" as the new parity.

Figure 4:
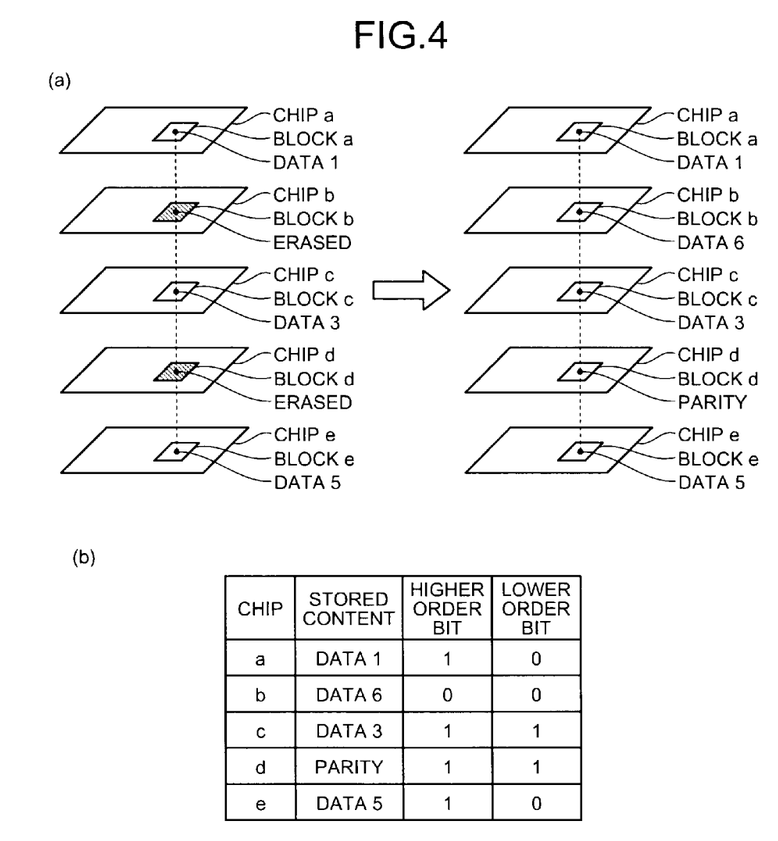
FIGS. 4a and 4b are diagrams for explaining a state in which data and a parity are stored.
Figure 5:
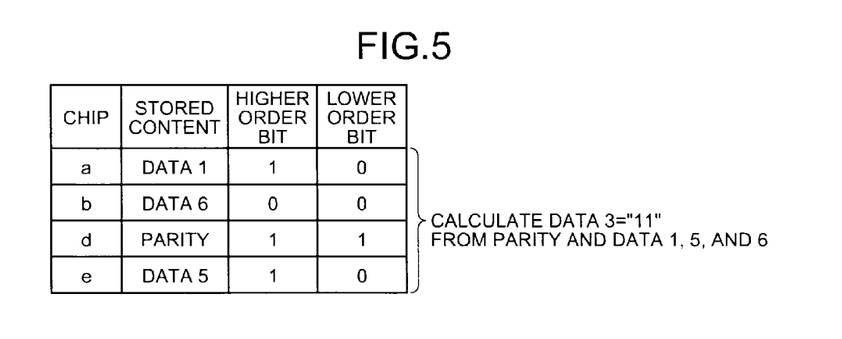
FIG. 5 is a diagram for explaining a state of data during a data failure.

As explained above, in the first embodiment, when data stored in a certain block is rewritten, a block in which a horizontal parity of the data is stored is a writing destination of writing data and the block in which the data before rewriting is stored is a storage destination of a new horizontal parity. Therefore, the position of a parity storage area dynamically changes across chips. Control circuits for accessing memory cells included in the chips "a" to "f" are respectively included in the chips "a" to "f". When the control circuit of a certain chip fails, no memory cells of the chips can be accessed. A state of data at the time when the chip c including the block "c" as the data storage area becomes inaccessible in the state shown in FIG. 4 is shown in FIG. 5. As shown in the figure, the parity is "11" and the other three data are "10", "00", and "10". Therefore, data lost in the block "c" is calculated as "11". In other words, data stored in the failed chip can be remedied.

Figure 6:
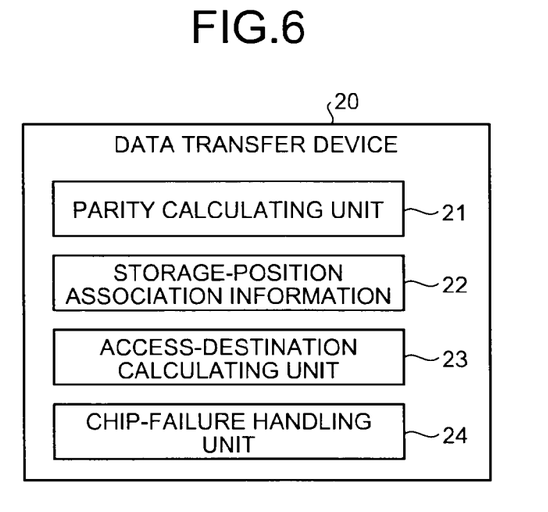
FIG. 6 is a diagram for explaining functional components of a data transfer device according to the first embodiment.

As shown in FIG. 6, the data transfer device 20 includes a parity calculating unit 21, a storage-position association information 22, an access-destination calculating unit 23, and a chip-failure handling unit 24 as functional components for performing data transfer according to the rules for storing data and a parity. The parity calculating unit 21 calculates a parity which is stored in the parity storage area. The storage-position association information 22 associates a block at an access destination as a logical address designated by address information and a data size included in a write/readout request received from the host apparatus 2 and a block at a storage destination of data as a physical address that changes according to the storage rules. The access-destination calculating unit 23 calculates, based on the storage-position association information 22, a data storage destination block corresponding to the access destination block. The chip-failure handling unit 24 remedies data stored in a failed chip. It is advisable to provide a storage area such as a register or a small memory in a position accessible by the parity calculating unit 21, the access-destination calculating unit 22, and the chip-failure handling unit 24 inside or outside the data transfer device 20 and store the storage-position association information 22 in the storage area.

A logical address and a physical address concerning a position in which data is stored are associated by the storage-position association information 22 in a one-to-one relation. Therefore, when one data storage block is selected in the storage-position association information 22, a block in a position same as the position of the selected data storage block in a chip other than a chip including the selected data storage block, which is a block of a physical address not associated with a logical block, is equal to a parity storage block in which a parity of data stored in the selected data storage block is stored. In other words, although a parity storage block corresponding to each of data storage blocks is not specified in the storage-position association information 22, a physical address of a parity storage block for each of the data storage blocks can be calculated by referring to the storage-position association information 22. The storage-position association information 22 can specify the parity storage block corresponding to each of the data storage blocks.

Figure 7:
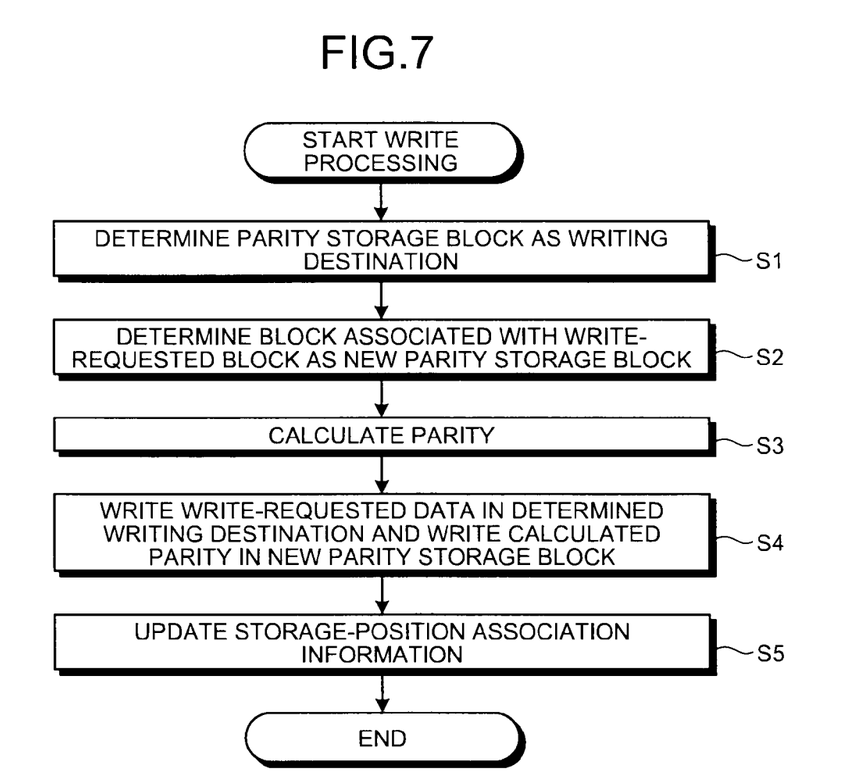
FIG. 7 is a flowchart for explaining the operation during write processing of the SSD according to the first embodiment.

FIG. 7 is a flowchart for explaining the operation during write processing.

As shown in FIG. 7, when a write request is received from the host apparatus 2, the access-destination calculating unit 23 calculates, referring to the storage-position association information 22, a data storage block corresponding to a write access destination block designated in the write request and a parity storage block that stores a parity of data stored in the data storage block and determines the calculated parity storage block as a writing destination of write-requested data (step S1). The access-destination calculating unit 23 determines the calculated data storage block as a new parity storage block (step S2). Data and parities stored in the blocks determined at steps S1 and S2 are erased.

Subsequently, the parity calculating unit 21 calculates a parity anew based on the write-requested data (step S3). The data transfer device 20 writes the write-requested data in the writing destination block determined at step S1 and writes the parity calculated at step S3 in the new parity storage block determined at step S2 (step S4). The access-destination calculating unit 23 updates the storage-position association information 22 (step S5). Specifically, the access-destination calculating unit 23 changes the data storage block associated with the block designated by the write request (the block determined as the new parity storage block at step S2) to the block determined at step S1. The operation of the write processing ends.

Figure 8:
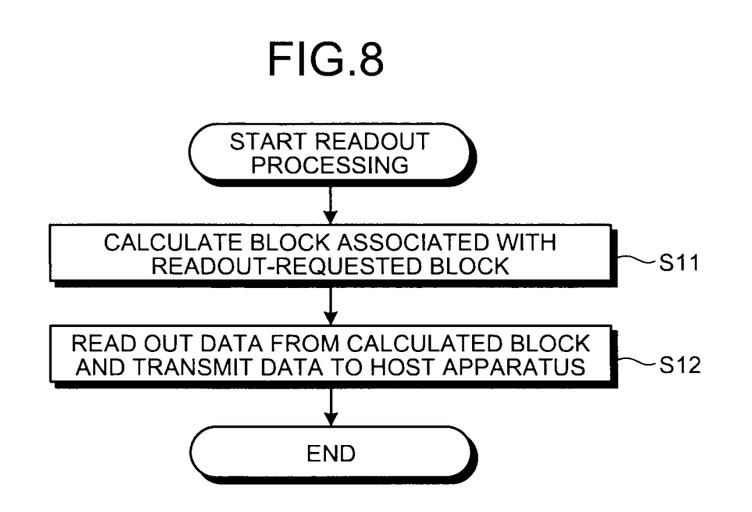
FIG. 8 is a flowchart for explaining the operation during readout processing of the SSD according to the first embodiment.

FIG. 8 is a flowchart for explaining the operation during readout processing. As shown in the figure, when a readout request is received from the host apparatus 2, the data transfer device 20 calculates, referring to the storage-position association information 22, a data storage block associated with a readout access destination block designated by the readout request (step S11). The data transfer device 20 reads out data from the calculated block and transmits the read-out data to the host apparatus 2 (step S12). The operation of the readout processing ends.

Figure 9:
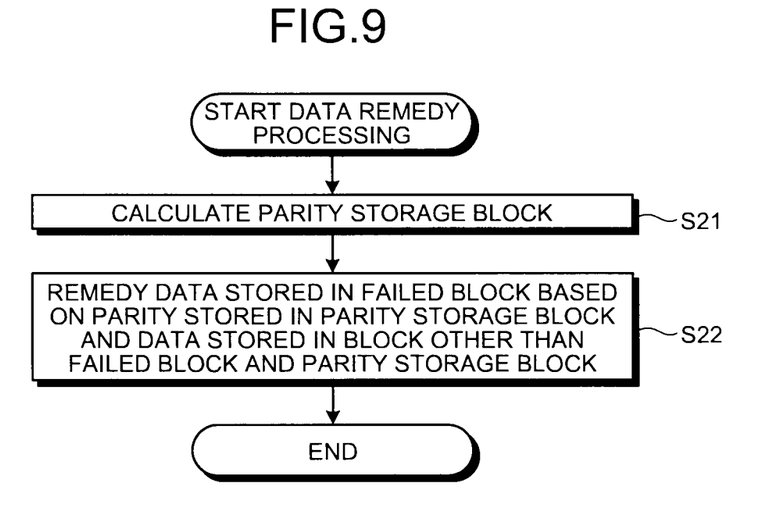
FIG. 9 is a flowchart for explaining the operation for remedying data of the SSD according to the first embodiment.

When the block calculated at step S12 is inaccessible, data remedy processing for remedying data is executed. FIG. 9 is a flowchart for explaining the data remedy processing. As shown in the figure, first, the chip-failure handling unit 24 calculates, referring to the storage-position association information 22, a parity storage block in which a parity of data stored in the inaccessible block (a failed block) is stored (step S21). The chip-failure handling unit 24 remedies, based on a parity stored in the calculated parity storage block and data stored in data storage blocks of the other chips located in a position same as the position of the failed block, the data stored in the failed block (step S22). The operation of the data remedy processing ends. The remedied data is transmitted to the host apparatus 2.

As explained above, one redundant chip is added to a chip group to make it possible to remedy, even if one chip fails, data stored in the failed chip. Therefore, it is possible to improve reliability of the entire NAND memory 10. In other words, it is possible to increase a fraction defective requested per one chip. As an example, when it is necessary to set a fraction defective of the entire SSD 1 to be equal to or lower than 3200 ppm in a memory system mounted with thirty-two chips, unless redundancy is imparted to the chips, it is necessary to set a fraction defective per one chip to be equal to or lower than 3200/32=100 ppm. On the other hand, when thirty-three chips are mounted and a failure of one chip is allowed by redundancy, the fraction defective per one chip is allowed up to about 2500 ppm. In other words, because a fraction defective required per one chip is relaxed while reliability of the entire memory system is secured, it is possible to simplify manufacturing of memory chips and memory systems.

Because the memory system has a plurality of chip groups, each of which has one redundant chip, it is possible to further improve reliability of the entire memory system compared with a memory system having only one chip group.

In the above explanation, the data remedy processing is executed when the block at the readout destination is inaccessible. However, the chip-failure handling unit 24 can store data remedied by the data remedy processing in a parity storage block located in a position same as the position of a failed block and does not have to use a parity after that. When a failure of a chip is found, the chip-failure handling unit 24 can execute the data remedy processing for data stored in a data storage block included in the chip and store the remedied data in a parity storage block located in a position same as the position of the failed block. Consequently, it is unnecessary to execute the data remedy processing again for a block for which the data remedy processing is executed once. Efficiency of the readout processing is improved.

In the above explanation, the horizontal parity is stored in the parity storage block. In other words, the horizontal parity is added to the group of data stored in the block in the position same as the position of the parity storage block in the other four chips. However, if it is possible to associate the parity storage block and respective data storage blocks as parity calculation targets in the other four chips, the parity stored in the parity storage block does not have to be the parity of the data stored in the data storage block in the same position.

In the above explanation, the even number parity is used as an error correction code. However, an odd number parity can be used. A checksum can be used as the error correction code instead of the parity. For example, although a check sum of "01", "11", and "10" is carried to "110", a value "10" of the last two digits is stored in the block in which the error correction code is stored. In the data remedy processing, lost data has a value obtained by subtracting the remaining data from the stored checksum. When the value is a negative value, the carry digit is added to the value to change the value to a positive value. For example, if "11" is lost, "01" and "10" are subtracted from the stored check sum "10". Then, a negative value "−01" is obtained. The lost value "11" can be calculated by adding the carry digit "100" to the negative value.

As explained above, according to the first embodiment of the present invention, the memory system has the chip group including a plurality of chips dividedly managed for each of the blocks. The block of one chip among the chips stores the error correction code of the group of blocks in the position same as the position of the blocks in the other chips. The chip that stores the error correction code is different for each of the blocks. When data is rewritten, the block that stores an error correction code of the data is designated as a writing destination of rewriting data and the block in which the data before rewriting is stored is designated as a storage destination of a new error correction code. Therefore, because a storage destination of the error correction code changes every time the data is rewritten, the number of times of rewriting for each of the chips is uniformalized. Even if one chip is read-disabled, data stored in the read-disabled chip can be remedies based on data of the other chips and the error correction code. Therefore, it is possible to relax a fraction defective allowed for a single chip while securing reliability of the entire memory system.

Figure 10:
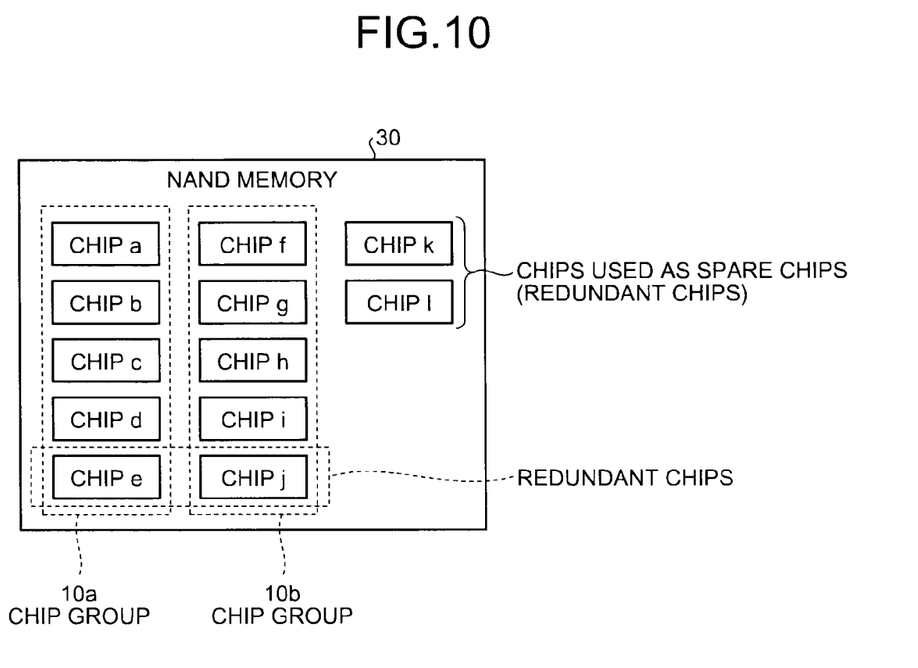
FIG. 10 is a diagram for explaining a configuration of a NAND memory included in a SSD according to a second embodiment of the present invention.

In a second embodiment of the present invention, in addition to the configuration of the first embodiment, the memory system further includes a redundant chip used as a spare of an access-disabled chip. FIG. 10 is a diagram for explaining a configuration of a NAND memory included in a SSD according to the second embodiment. Components other than the NAND memory according to the second embodiment are the same as those in the first embodiment. Therefore, the names and the reference numerals used in the first embodiment are used in the second embodiment. Functional components of the data transfer device 20 according to the second embodiment are the same as those in the first embodiment except the operation of a chip-failure handling unit. Therefore, the names and the reference numerals used in the first embodiment are used in the second embodiment.

As shown in FIG. 10, a NAND memory 30 according to the second embodiment includes one or more (two in this explanation) chips "k" and "l" as spare chips in addition to the chips "a" to "j". When one or two of the chips "a" to "j" become inaccessible, the chips "k" and "l" are started to be used instead of the inaccessible chips (failed chips).

Figure 11:
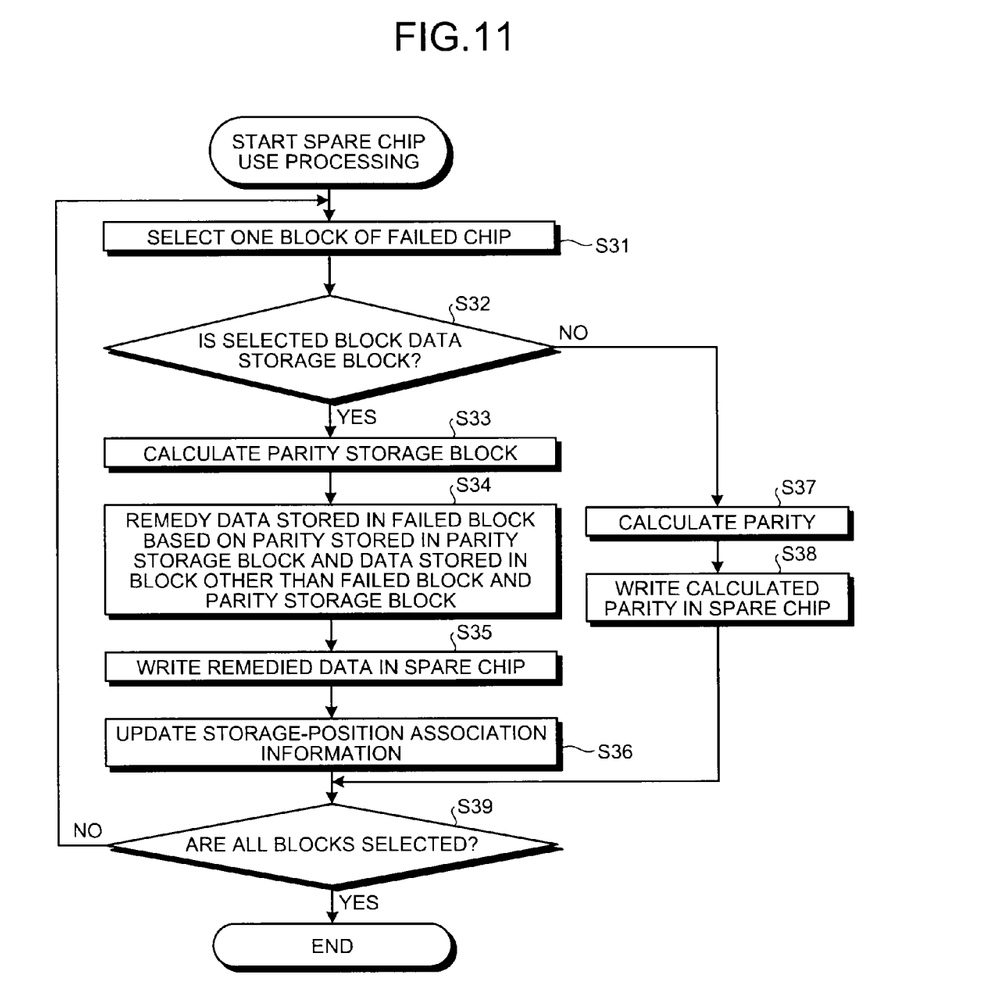
FIG. 11 is a flowchart for explaining the operation for starting the use of a spare chip of the SSD according to the second embodiment.

FIG. 11 is a flowchart for explaining processing for starting the use of a spare chip. As shown in the figure, first, the chip-failure handling unit 24 selects one block from a failed chip (step S31). The chip-failure handling unit 24 determines, referring to the storage-position association information 22, whether the selected block is a data storage block (step S32). When the selected block is the data storage block ("Yes" at step S32), the chip-failure handling unit 24 executes the data remedy processing shown in FIG. 9 at steps S33 and S34 and remedies the data stored in the selected block.

The chip-failure handling unit 24 writes the remedied data in a position same as the position of the selected block in the spare chip (step S35). The chip-failure handling unit 24 updates the storage-position association information 22 (step S36). Specifically, the chip-failure handling unit 24 changes a description of the failed block selected at step S31 in the storage-position association information 22 to a description of a block at a writing destination of the spare chip in which the data is written at step S35.

On the other hand, when the selected block is not the data storage block at step S32 ("No" at step S32), the selected block is a parity storage block. Therefore, the chip-failure handling unit 24 calculates a parity stored in the block again (step S37). The chip-failure handling unit 24 writes the calculated parity in a position same as the position of the failed block selected at step S31 in the spare chip (step S38).

After step S36 or S38, the chip-failure handling unit 24 determines whether all blocks are selected from the failed chip (step S39). When all the blocks are not selected yet ("No" at step S39), the chip-failure handling unit 24 shifts to step S31 and selects one unselected block. When all the blocks are already selected ("Yes" at step S39), the processing for starting the use of the spare chip ends.

Whichever of the chip "k" and the chip "l" can start to be used earlier as the spare chip.

As explained above, according to the second embodiment, the memory system further includes the spare chip. When a chip belonging to a chip group becomes inaccessible, data remedied from the inaccessible chip is stored in the spare chip. Therefore, it is possible to further improve reliability of the entire memory system compared with the first embodiment. Therefore, when reliability of the same level is demanded for the entire memory system, it is possible to further relax a fraction defective allowed for a single chip compared with the first embodiment. The reliability of the entire memory system is further improved as the number of spare chips is larger.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
a memory chip group including n chips of a nonvolatile semiconductor memory dividedly managed for each of unit areas having predetermined sizes, the memory chip group including a plurality of area groups each including n unit areas each belonging to a different respective chip among the n chips, one unit area for each area group storing only an error correction code for data stored in the other n−1 unit areas; and
an access-destination calculating unit configured to operate, when a write operation to write first data to an address which is associated with a first unit area storing second data is requested, erasure of the second data and an error correction code stored in a second unit area, designate the second unit area as a write destination of the first data and designate the first unit area as a storage destination of a new error correction code.

2. The memory system according to claim 1, wherein each unit area is configured with a block which is a minimum unit for erase operation or a plurality of the blocks.

3. The memory system according to claim 1, further comprising a chip-failure handling unit that remedies, when one chip among the n chips becomes readout-disabled, data stored in the readout-disabled chip based on the error correction code and the data stored for each of the unit areas in the n−1 chips excluding the readout-disabled chip.

4. The memory system according to claim 1, wherein the memory system includes a plurality of the memory chip groups.

5. The memory system according to claim 3, further comprising a spare chip including a chip of the nonvolatile semiconductor memory, wherein
the chip-failure handling unit stores the remedied data in the spare chip.

6. The memory system according to claim 1, wherein the error correction code is a parity.

7. The memory system according to claim 1, wherein the error correction code is a checksum.

8. The memory system according to claim 1, wherein the chips of the nonvolatile semiconductor memory are respectively NAND flash memory chips.

9. A computer system comprising a memory system, the memory system including:
   a memory chip group including n chips of a nonvolatile semiconductor memory dividedly managed for each of unit areas having predetermined sizes, the memory chip group including a plurality of area groups each including n unit areas each belonging to a different respectively chip among the n chips, one unit area for each area group storing only an error correction code for data stored in the other n−1 unit areas; and
   an access-destination calculating unit configured to operate, when a write operation to write first data to an address which is associated with a first unit area storing second data is requested, erasure of the second data and an error correction code stored in a second unit area, designate the second unit area as a write destination of the first data and designate the first unit area as a storage destination of a new error correction code.

10. The computer system according to claim 9, wherein each unit area is configured with a block which is a minimum unit for erase operation or a plurality of the blocks.

11. The computer system according to claim 9, wherein the memory system further includes a chip-failure handling unit that remedies, when one chip among the n chips becomes readout-disabled, data stored in the readout-disabled chip based on the error correction code and the data stored for each of the unit areas in the n−1 chips excluding the readout-disabled chip.

12. The computer system according to claim 9, wherein the memory system includes a plurality of the memory chip groups.

13. The computer system according to claim 11, wherein
   the memory system further includes a spare chip including a chip of the nonvolatile semiconductor memory, and
   the chip-failure handling unit stores the remedied data in the spare chip.

14. The computer system according to claim 9, wherein the error correction code is a parity.

15. The computer system according to claim 9, wherein the error correction code is a checksum.

16. The computer system according to claim 9, wherein the chips of the nonvolatile semiconductor memory are respectively NAND flash memory chips.

17. The computer system according to claim 1, wherein the n error correction code stored in the second unit area belonging to the same area group with the first unit area.

18. The computer system according to claim 9, wherein the n error correction code stored in the second unit area belonging to the same area group with the first unit area.

* * * * *